United States Patent [19]

Van Der Plaats et al.

[11] 3,864,532

[45] Feb. 4, 1975

[54] TONE RINGER WITH A NEGATIVE IMPEDANCE AMPLIFIER

[75] Inventors: Petrie Johan Van Der Plaats, Hilversum; Eduard Willem Van Zuuren, Emmasingel, Eindhoven, both of Netherlands

[73] Assignee: U.S. Philips Corporation, New York, N.Y.

[22] Filed: Nov. 11, 1971

[21] Appl. No.: 197,855

[30] Foreign Application Priority Data

Nov. 24, 1970 Netherlands ...................... 7017136

[52] U.S. Cl. ............................................ 179/84 T

[51] Int. Cl. .......................................... H04m 1/26

[58] Field of Search ... 179/84 T; 331/108 A, 117 R, 331/116 M, 116 R, 165

[56] References Cited

UNITED STATES PATENTS

| | | | |
|---|---|---|---|
| 2,759,179 | 8/1956 | Kircher | 179/84 T |
| 3,218,395 | 11/1965 | Suda | 179/84 T |
| 3,459,899 | 8/1969 | Lane | 179/84 T |
| 3,466,403 | 9/1969 | Combridge | 179/84 T |
| 3,467,788 | 9/1969 | Why | 179/84 T |

FOREIGN PATENTS OR APPLICATIONS

| | | | |
|---|---|---|---|
| 678,522 | 1/1964 | Canada | 179/84 T |

*Primary Examiner*—Kathleen H. Claffy
*Assistant Examiner*—Alan Faber
*Attorney, Agent, or Firm*—Frank R. Trifari; Bernard Franzblau

[57] ABSTRACT

A tone ringer device that includes an electroacoustic converter having a pair of electric terminals directly connected to the ports of a two-port amplifier having a negative impedance. A rectifier bridge circuit converts the ringing signals into a DC supply voltage for the amplifier. At a given frequency, the electroacoustic converter exhibits an electrical impedance between its terminals having a maximum magnitude with a zero phase angle.

11 Claims, 4 Drawing Figures

INVENTORS
PETRIE J. VAN DER PLAATS
EDUARD W. VAN ZUUREN
BY
Frank R. Trifari
AGENT

INVENTORS
PETRIE J. VAN DER PLAATS
EDUARD W. VAN ZUUREN
BY
AGENT

TONE RINGER WITH A NEGATIVE IMPEDANCE AMPLIFIER

The invention relates to a device for producing acoustic power in response to ringing signals, and more particularly to a tone ringer of the type comprising an electro-acoustic converter which is provided with two electrical connection terminals and an acoustic resonator, an amplifier and a supply device for converting the ringing signals into a supply voltage for the amplifier.

Such devices are used inter alia in telephone sets for indicating incoming calls. Generally A.C. bells are used. These have the drawback that the transmitted acoustic power is largely located in the range of the higher audio frequencies and is therefore poorly audible to older persons. To eliminate this drawback ringers are used which consist of a combination of an electric oscillator and an electro-acoustic converter. Generally the electro-acoustic converter is provided with an acoustic resonator having a relatively narrow frequency band. As a result the sound level is increased without having a supply extra electrical energy. The frequency of the electric oscillator must then be matched accurately to that of the electro-acoustic converter.

An object of the present invention is to provide a novel conception of the device described in the preamble for obtaining an optimum acoustic power without further control or matching.

The device according to the invention is characterized in that the electrical connection terminals of the electro-acoustic converter are directly connected to the ports of an amplifier formed as a two-port amplifier having a negative impedance. The electro-acoustic converter is arranged so that, across its electrical connection terminals, it exhibits an electrical impedance having a maximum magnitude when its phase angle is zero. A two-port amplifier having a negative impedance may be defined as a two-terminal active network that exhibits a negative impedance region in its V-I characteristic.

In order that the invention may be readily carried into effect, two embodiments thereof will now be described in detail, by way of example, with reference to the accompanying diagrammatic drawings in which.

Figure 1:
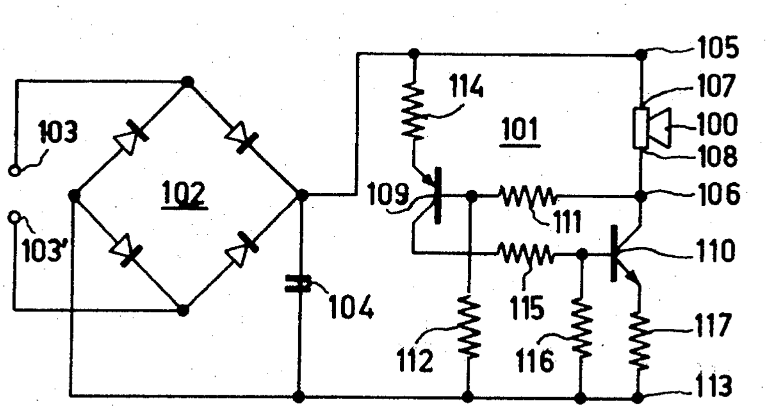
FIG. 1 shows an embodiment of a device according to the invention.

FIG. 1 shows a ringer for producing acoustic power in response to ringing signals, for example, for use in telephone sets. This ringer comprises an electro-acoustic converter 100, an amplifier 101 and a diode bridge rectifier 102. The ringing signals, which are constituted by an alternating voltage whose frequency in telephone usage may range from 16 ⅔ Hz to 60 Hz, are applied through the input terminals 103–103′ to one diagonal of the bridge rectifier 102, so that a direct voltage is produced across the smoothing capacitor 104 which is connected across the other bridge diagonal. This direct voltage serves as a supply voltage for the amplifier 101.

According to the invention amplifier 101 is constituted as a two-port amplifier having a negative impedance, i.e., a non-self oscillating two-port regenerative feedback amplifier. The two ports of this amplifier are denoted in FIG. 1 by the reference numerals 105 and 106. The electro-acoustic converter 100 has two electrical connection terminals 107 and 108. The terminals 107 and 108 are directly connected to the ports 105 and 106 of two-port amplifier 101. The two-port amplifier 101 includes a transistor 109 of the pnp-type and a transistor 110 of the npn-type. The base of transistor 109 is connected through a resistor 111 to port 106 and is connected through a resistor 112 to a voltage reference point 113. The emitter of transistor 109 is connected through a resistor 114 to port 105 and the collector is connected through a resistor 115 to the base of transistor 110. This base in turn is connected through a resistor 116 to the reference point 113. The emitter of transistor 110 is connected through a resistor 117 to the reference point 113 and the collector is directly connected to port 106. The amplifier 101 does not include reactive elements such as capacitors and coils and therefore it is not a tuned amplifier and will not self-oscillate. The supply voltage for the amplifier is applied between the port 105 and the reference point 113.

Figure 2:
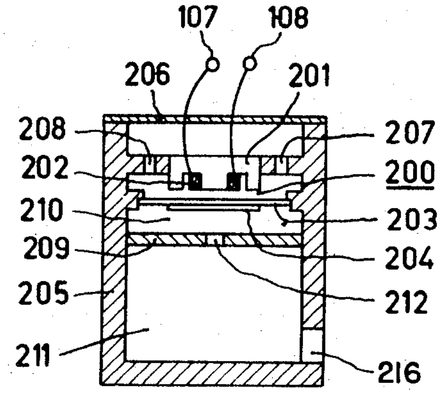
FIG. 2 is a cross-section of an electro-acoustic converter.
Figure 3:
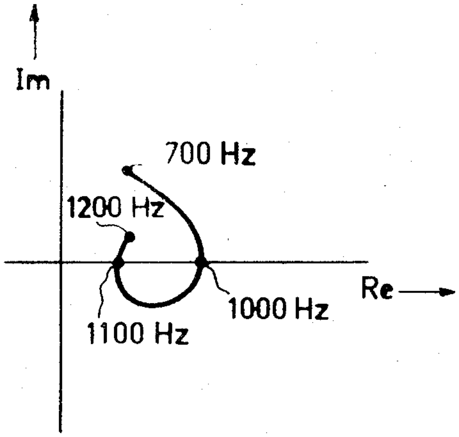
FIG. 3 shows the impedance characteristic of an electro-acoustic converter according to FIG. 2.

FIG. 2 shows a simplified cross-section and FIG. 3 shows a part of the impedance characteristic measured between the electrical connection terminals of an electro-acoustic converter suitable for use in the device according to FIG. 1. The electro-acoustic converter according to FIG. 2 comprises an electro-magnetic system which is generally denoted by the reference numeral 200 and which is constituted in known manner by a core 201 of magnetic material which is open at one end and has a winding 202 provided thereon. The electromagnetic system also includes a diaphragm 203 facing the open end of the core and having a magnetic short circuit bridge 204 secured thereto. The electrical connection terminals 107 and 108 are constituted by the ends of winding 202.

The electro-magnetic system 200 is accommodated in a cylinder 205 whose upper end is closed by a cover plate 206. The lower side of cylinder 205 accommodates an aperture 216 through which the acoustical energy can emerge. The diaphragm 203 is secured against the inner wall of cylinder 205 and splits up the inner space of the cylinder into two parts, an upper part and a lower part. The upper part in turn is split up into two parts by the core 201 which parts communicate with each other through the apertures 207 and 208. The lower part of the cylinder is split up by a partition 209 into a coupling cavity 210 and a Helmholtz resonator 211. The coupling cavity 210 and the resonator 211 communicate with each other through the aperture 212 in partition 209.

The impedance characteristic which can be measured between the terminals 107 and 108 is dependent on the dimensions of the cylinder, the properties of the diaphragm and the presence or non-presence of a coupling cavity such as the coupling cavity 210. By experimentally determined choice of the dimensions of the cylinder and the properties of the diaphragm an impedance characteristic measured between terminals 107 and 108 (with or eventually without the use of coupling cavity 210) can be realized as is illustrated in FIG. 3. The characteristic illustrated in FIG. 3 shows the variation of the impedance with the frequency for the frequency range from 700 to 1200 Hz. The real part Re is plotted on the horizontal axis in FIG. 3 and the imaginary part Im of the impedance measured between terminals 107 and 108 is plotted on the vertical axis. This characteristic has the special feature that at the point of the characteristic where the magnitude of the impedance (as a function of frequency) is maximum (in FIG. 3 at 1000 Hz) the angle of the impedance is zero. Thus, at this point the impedance is real.

The use of an electro-acoustic converter according to FIGS. 2 and 3 in the device according to FIG. 1 gives rise to the following operation of this device in response to ringing signals. When a ringing signal is received at the terminals 103 and 103', a supply voltage pulse is produced, after rectification and smoothing, between the reference point 113 and port 105. This supply voltage pulse excites the electro-acoustic converter 100 so that a damped electrical oscillation will be produced between the terminals 107 and 108. As is the case when exciting an electric LC circuit, this damped electrical oscillation will mainly have the frequency at which the magnitude of the impedance is at its maximum and the angle is at its minimum, that is to say, a frequency of 100 Hz in the relevant case.

During the first half period of the damped electrical oscillation between the terminals 107 and 108, where terminal 108 has a negative voltage relative to terminal 107, transistor 109 is rendered conducting through resistor 111. When transistor 109 conducts, it allows a base current to flow through resistor 115 into the base of transistor 110 so that this transistor is rendered conducting. As a result, the current flowing from terminal 107 to terminal 108 increases and the voltage of port 106 becomes still more negative relative to that of port 105. The result is that transistor 109 is driven still farther into conduction through the resistor 111. Due to this regenerative feedback from port 106 through transistor 109 to the base of transistor 110, the transistors 109 and 110 are very rapidly driven into saturation. Consequently, a negative going pulse is produced at the collector of transistor 110, which pulse is applied to the electro-acoustic converter 100.

In this manner transistor 110 causes a strong amplification of the damped oscillation between terminals 107 and 108 brought about in the first instance by the supply voltage pulse. At the end of the relevant half period of the oscillation between the terminals 107 and 108 the voltage between these terminals reverses its sign and the voltage of port 106 becomes more positive than the voltage of port 105. The regenerative feedback from port 106 through transistor 109 to the base of transistor 110 is now active so as to render the transistors 109 and 110 non-conducting in a very rapid manner. During the half period of the oscillation between the terminals 107 and 108, in which the voltage of terminal 108 is more positive than the voltage of terminal 107, the transistors 109 and 110 remain non-conducting. At the end of this half period the voltage between the terminals 107 and 108 reverses its sign and the voltage of terminal 108 becomes negative relative to the voltage of terminal 107. As a result the transistors 109 and 110 are again rendered conducting very rapidly so that a new pulse is applied to the electro-acoustic converter. This results in a new damped oscillation being produced so that the described cycle is again repeated. Since the circuit has no reactive tuning elements apart from the electro-acoustic resonator itself, the oscillation frequency is automatically matched to the natural resonant frequency of the electro-acoustic resonator.

Figure 4:
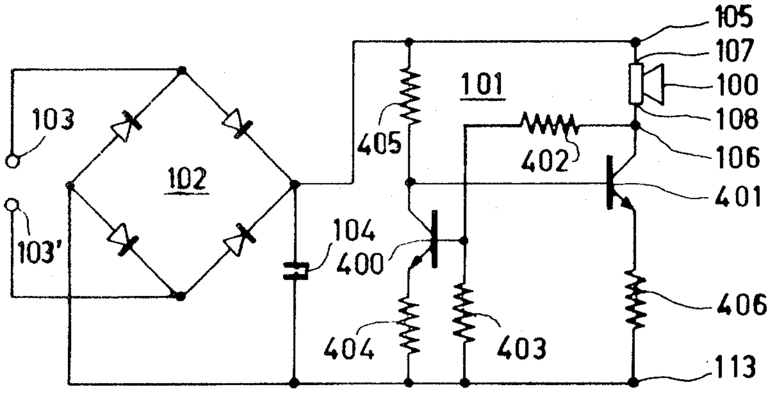
FIG. 4 shows a second embodiment of a device according to the invention.

FIG. 4 shows an alternative embodiment of amplifier 101. This amplifier includes two transistors 400 and 401 of the same conductivitity type, in this case of the npn-type. The base of transistor 400 is connected through resistor 402 to port 106 and is connected through resistor 403 to the reference point 113. The emitter of transistor 400 is connected through resistor 404 to the reference point 113 and the collector is connected through resistor 405 to port 105 and is directly connected to the base of transistor 401. The collector of transistor 401 is connected to port 106 and the emitter is connected through resistor 406 to reference point 113. Upon the occurrence of the supply voltage pulse between the reference point 113 and port 105, a damped electrical oscillation is produced between the terminals 107 and 108. During the first half period of the oscillation between the terminals 107 and 108, where the voltage of terminal 108 is more negative than the voltage of terminal 107, transistor 400 is maintained non-conducting through the potential divider 402–403. Transistor 401 then receives base current through resistor 405 and is thereby rendered conducting. The regenerative feedback from port 106 through transistor 400 to the base of transistor 401 ensures that transistor 401 is very rapidly bottomed. The operation is furthermore analogous to the operation of amplifier 101 in the embodiment according to FIG. 1.

The amplifier 101 undamps the damped electrical oscillation between the terminals 107 and 108 of the electro-acoustic converter 100, which oscillation is excited by the supply voltage pulse. This converter will therefore produce acoustical energy mainly at a frequency which is equal to the frequency of the electrical oscillation between the terminals 107 and 108, i.e., in this case a frequency of 1000 Hz.

The amplifier 101 and the electro-acoustic converter 100 combined constitute an electro-acoustic oscillator whose tuning is entirely determined by the electro-acoustic converter. This has been made possible by proportioning the electro-acoustic converter such that, in conformity with FIG. 3, at the maximum magnitude of the impedance measured between the terminals 107 and 108, the angle of the impedance is zero, that is to say, current and voltage are in phase at that point. The amplifier 101 does not include tuning elements and can be characterized as an amplifier having two ports 105 and 106 between which a negative impedance occurs, that is to say, an impedance which has a negative real part in the relevant frequency range (in this case in the vicinity of 1000 Hz), which part is responsible for undamping the impedance occurring between the terminals 107 and 108 of the electro-acoustic converter 100.

When the capacitance of smoothing capacitor 104 in the devices according to FIGS. 1 and 4 is chosen to be not too large, a ripple voltage of double the ringing frequency is produced thereacross when a ringing signal is received. This ripple voltage modulates the electrical oscillation of 1000 Hz which occurs between the terminals 107 and 108 of the electro-acoustic converter. The electro-acoustic converter then produces a modulated 1000 Hz acoustic signal. This increases the audibility of the acoustic ringing signal.

What is claimed is:

1. A device for producing acoustic power in response to ringing signals, comprising an electroacoustic converter that exhibits an impedance variation as a function of frequency and is provided with two electrical connection terminals and an acoustic resonator, a two-port amplifier having a negative impedance amplifier, a supply device for converting the ringing signals into a supply voltage for the amplifier, means directly connecting the two electrical connection terminals of the electro-acoustic converter to the two ports of said amplifier, the electro-acoustic converter being arranged so that at a given frequency there occurs a maximum magnitude of electrical impedance between the electrical connection terminals with the angle of this impedance being equal to zero.

2. A device as claimed in claim 1, characterized in that the amplifier includes two transistors and circuit connection means for cross-coupling the base and the collector of one transistor to the collector and the base, respectively, of the other transistor.

3. A device as claimed in claim 1, characterized in that the transistors are of the same conductivity type.

4. A device as claimed in claim 1 wherein the electrical impedance of the electro-acoustic converter is connected in the collector circuit of one of the transistors.

5. A device as claimed in claim 1 wherein the electro-acoustic converter is designed to have an impedance-frequency characteristic approximately of the form shown in FIG. 3.

6. An electroacoustic oscillator circuit for converting ringing signals of a first frequency into acoustic power of a second frequency comprising, a pair of input terminals adapted to receive the ringing signals, a non-selfoscillating two-port regenerative feedback amplifier, a supply device coupled between the input terminals and the amplifier for converting the ringing signals into a supply voltage for the amplifier, an electroacoustic converter whose impedance varies with frequency and including an acoustic resonator and only two electric terminals, means directly connecting the two terminals of the electroacoustic converter to respective ports of said amplifier, said electroacoustic converter being designed to have an impedance variation as a function of frequency such that the oscillator circuit will oscillate at the frequency at which the absolute value of the electric impedance of the electro-acoustic converter is a maximum.

7. An oscillator as claimed in claim 6 wherein the amplifier comprises first and second transistors with circuit means cross-connecting the base and collector of one transistor to the collector and base, respectively, of the other transistor to form a bistable operating device.

8. An oscillator as claimed in claim 6 wherein the circuit elements constituting the two-port amplifier include only resistors and other substantially non-reactance elements whereby the electroacoustic converter solely determines the oscillation frequency of the oscillator.

9. An oscillator as claimed in claim 6 wherein the electroacoustic converter comprises, a cylindrical housing, a diaphragm secured to the inner wall of the cylinder to divide same into an upper part and a lower part, an apertured magnetic core with a winding mounted thereon and secured in the upper part of the cylinder, an apertured partition member secured to the inner wall of the cylinder so as to divide the lower part of the cylinder into two cavities that communicate with each other via the aperture in the partition member, means for closing the upper end of the cylinder, and means providing an aperture in the cylinder wall by which the outside air communicates with the lower of said two cavities.

10. An electroacoustic converter system for converting an AC electric ringing signal into an acoustic signal comprising, a pair of input terminals adapted to receive the AC ringing signal, a two-port negative impedance device including a positive feedback amplifier devoid of reactive tuning elements and exhibiting a negative impedance between its two ports, supply means coupled between the input terminals and the negative impedance device for converting an AC ringing signals received into a DC supply voltage for the amplifier, an electroacoustic transducer exhibiting a resonant frequency and having two electric terminals directly connected to the two ports of the negative impedance device, said transducer being operative to be the sole control of the ringing frequency of the converter system upon receipt of an electric ringing signal at said input terminals whereby the system automatically oscillates at the transducer resonant frequency.

11. A converter system as claimed in claim 10 wherein said amplifier includes only resistive passive circuit elements and a transistor connected thereto so as to operate the transistor in a switching mode between cut-off and saturation states.

* * * * *